(12) United States Patent
Kim

(10) Patent No.: US 9,834,190 B2
(45) Date of Patent: Dec. 5, 2017

(54) PARKING BRAKE SYSTEM OF EMB USING HYDRAULIC DEVICE AND PARKING BRAKE CONTROL METHOD FOR EMB

(71) Applicant: Hyundai Mobis Co., Ltd., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 304 days.

(21) Appl. No.: 14/273,097

(22) Filed: May 8, 2014

(65) Prior Publication Data

US 2015/0075922 A1 Mar. 19, 2015

(30) Foreign Application Priority Data

Sep. 16, 2013 (KR) .................. 10-2013-0110948

(51) Int. Cl.
| | |
|---|---|
| *B60T 13/00* | (2006.01) |
| *B60T 13/68* | (2006.01) |
| *B60T 13/58* | (2006.01) |
| *B60T 13/66* | (2006.01) |
| *B60T 13/74* | (2006.01) |

(52) U.S. Cl.
CPC .......... *B60T 13/686* (2013.01); *B60T 13/588* (2013.01); *B60T 13/662* (2013.01); *B60T 13/741* (2013.01)

(58) Field of Classification Search
CPC ........ B60T 13/686; B60T 13/662; B60T 8/17; B60T 8/326; B60T 13/66; B60T 2270/608; B60T 8/266; B60T 8/268; B60T 13/14; B60T 8/348; B60T 8/40; B60T 8/48
USPC ......................................... 303/20
See application file for complete search history.

(56) References Cited

U.S. PATENT DOCUMENTS

| | | | | |
|---|---|---|---|---|
| 743,133 | A * | 11/1903 | Maron | ............ F16H 3/16 74/333 |
| 7,227,324 | B2 * | 6/2007 | Erben | ............ B60T 7/045 318/362 |
| 7,744,166 | B2 * | 6/2010 | Leiter | ............ B60T 7/107 188/106 P |

(Continued)

FOREIGN PATENT DOCUMENTS

KR         101138510 B1 *   4/2012   ............ B60T 13/741

OTHER PUBLICATIONS

Abstract and English translation of KR 101138510 B1.*

*Primary Examiner* — Anna Momper
*Assistant Examiner* — Mahbubur Rashid
(74) *Attorney, Agent, or Firm* — NSIP Law

(57) ABSTRACT

Disclosed are a parking brake system of an EMB used in combination with a hydraulic device, and a parking brake control method for an EMB. The parking brake system of an EMB according to an exemplary embodiment of the present invention includes: a pedal unit which has a configuration in which a pedal simulator and a master cylinder are coupled; electromechanical brakes (EMBs) each of which has a hydraulic piston device; first hydraulic lines which are connected so as to supply hydraulic pressure from the master cylinder to the hydraulic piston devices of the EMBs; first solenoid valves which are provided to change a communication state of the first hydraulic lines; second hydraulic lines which are extended between the first solenoid valves and the EMBs, and connected to a reservoir; and second solenoid valves which are provided to change a communication state of the second hydraulic lines.

17 Claims, 4 Drawing Sheets

(56) References Cited

U.S. PATENT DOCUMENTS

| | | | | |
|---|---|---|---|---|
| 8,287,054 B2* | 10/2012 | Beer | ............ | B60T 8/368 |
| | | | | 303/10 |
| 8,483,923 B2* | 7/2013 | Blattert | ............ | B60T 13/588 |
| | | | | 701/70 |
| 8,494,745 B2* | 7/2013 | Schneider | ............ | B60T 7/107 |
| | | | | 303/3 |
| 2005/0006948 A1* | 1/2005 | Friesen | ............ | B60T 8/1705 |
| | | | | 303/20 |
| 2005/0082908 A1* | 4/2005 | Klode | ............ | B60T 13/02 |
| | | | | 303/20 |
| 2005/0140205 A1* | 6/2005 | Ante | ............ | B60T 17/221 |
| | | | | 303/20 |
| 2006/0152073 A1* | 7/2006 | Sibre | ............ | B60T 8/1703 |
| | | | | 303/20 |
| 2006/0267402 A1* | 11/2006 | Leiter | ............ | B60T 7/107 |
| | | | | 303/20 |
| 2008/0053760 A1* | 3/2008 | Oikawa | ............ | B60T 13/745 |
| | | | | 188/72.4 |
| 2009/0278401 A1* | 11/2009 | Summers | ............ | B60T 17/22 |
| | | | | 303/20 |
| 2011/0168502 A1* | 7/2011 | Linhoff | ............ | B60T 13/588 |
| | | | | 188/72.2 |
| 2013/0213746 A1* | 8/2013 | Poertzgen | ............ | B60T 7/042 |
| | | | | 188/72.6 |
| 2013/0338895 A1* | 12/2013 | Bieltz | ............ | B60T 7/042 |
| | | | | 701/70 |
| 2014/0203626 A1* | 7/2014 | Biller | ............ | B60T 8/4081 |
| | | | | 303/10 |
| 2014/0303865 A1* | 10/2014 | Bohm | ............ | B60T 13/745 |
| | | | | 701/70 |

* cited by examiner

PARKING BRAKE SYSTEM OF EMB USING HYDRAULIC DEVICE AND PARKING BRAKE CONTROL METHOD FOR EMB

CROSS-REFERENCE TO RELATED APPLICATION

This application claims priority to and the benefit of Korean Patent Application No. 10-2013-0110948 filed in the Korean Intellectual Property Office on Sep. 16, 2013, the entire contents of which are incorporated herein by reference.

TECHNICAL FIELD

The present invention relates to a parking brake system and a parking brake control method which enable a parking brake in which hydraulic pressure is excluded, in an electromechanical brake (EMB) using a hydraulic boost structure.

BACKGROUND OF THE INVENTION

An electromechanical brake (EMB) is an electric brake device that presses a piston by converting rotational force of a drive motor into rectilinear motion using a screw/nut mechanism without using hydraulic pressure. In the EMB, when a screw gear is rotated by a gear that increases rotational force of the drive motor, a spindle converts rotational motion of the screw gear into rectilinear motion so as to press the piston, and the pressed piston presses a pad against a wheel disc, such that a caliper body is moved by reaction force generated by piston force.

Recently, a hybrid EMB system, which is used in combination with a hydraulic device in the EMB, has been suggested. In the EMB, a separate abrasion compensation device needs to be provided for compensating for abrasion of a brake pad, and a separate motor and multiple peripheral components are required to compensate for abrasion, and as a result, there is a problem in that a volume and a weight of the EMB are increased.

However, in the case of the aforementioned EMB system used in combination with a hydraulic device, a function of compensating for abrasion may be performed using a more simple structure and configuration, thereby reducing a weight and a volume of the EMB. Further, at the time of an emergency, braking force may be generated by a mechanical mechanism, thereby ensuring sufficient brake safety.

The EMB system used in combination with a hydraulic device is disclosed in Korean Patent No. 10-1138510. However, there is a problem in that it is difficult to add a parking brake function to the EMB system disclosed in the patent.

SUMMARY OF THE INVENTION

The present invention has been made in an effort to provide a parking brake system of an EMB, which adds a parking brake function to an EMB system used in combination with a hydraulic device, and a parking brake control method for an EMB.

An exemplary embodiment of the present invention provides a parking brake system of an EMB including: a pedal unit which has a configuration in which a pedal simulator and a master cylinder are coupled; electromechanical brakes (EMBs) each of which has a hydraulic piston device; first hydraulic lines which are connected so as to supply hydraulic pressure from the master cylinder to the hydraulic piston devices of the EMBs; first solenoid valves which are provided to change a communication state of the first hydraulic lines; second hydraulic lines which are extended between the first solenoid valves and the EMBs, and connected to a reservoir; and second solenoid valves which are provided in the second hydraulic lines to change a communication state of the second hydraulic lines.

Another exemplary embodiment of the present invention provides a parking brake control method for an EMB in the brake control system of the EMB, including: a first step of generating braking force through a drive motor, which has an amount of force F+d that is produced by adding a predetermined amount of force d to an amount of clamping force F that is required when a parking brake signal is turned on; a second step of controlling the amount of force F+d to be reduced to the amount of force F when the second solenoid valve allows the second hydraulic line to be communicated; a third step of allowing the braking force to have the amount of force F+d by pressing the master piston using the drive motor; a fourth step of repeatedly performing the second and third steps until the master piston comes into contact with the slave piston; and a fifth step of constraining rotational force of the drive motor of the EMB actuator when the master piston comes into contact with the slave piston.

In this case, in the fourth step, the contact between the master piston and the slave piston may be determined while assuming that this contact occurs when current consumption exceeds a reference value.

In the exemplary embodiments of the present invention, the hydraulic lines, which are extended between the existing solenoid valves and the EMB actuators and connected to the reservoir, are added to the EMB system used in combination with a hydraulic device, and the solenoid valves, which may change communication states of the hydraulic lines, are added, and as a result, a structure in which braking clamping force is supported by a mechanical device, which excludes hydraulic pressure when performing a parking brake function, may be implemented even in the EMB system used in combination with a hydraulic device.

DETAILED DESCRIPTION OF THE EMBODIMENTS

Hereinafter, exemplary embodiments of the present invention will be specifically described with reference to the accompanying drawings.

Figure 1:
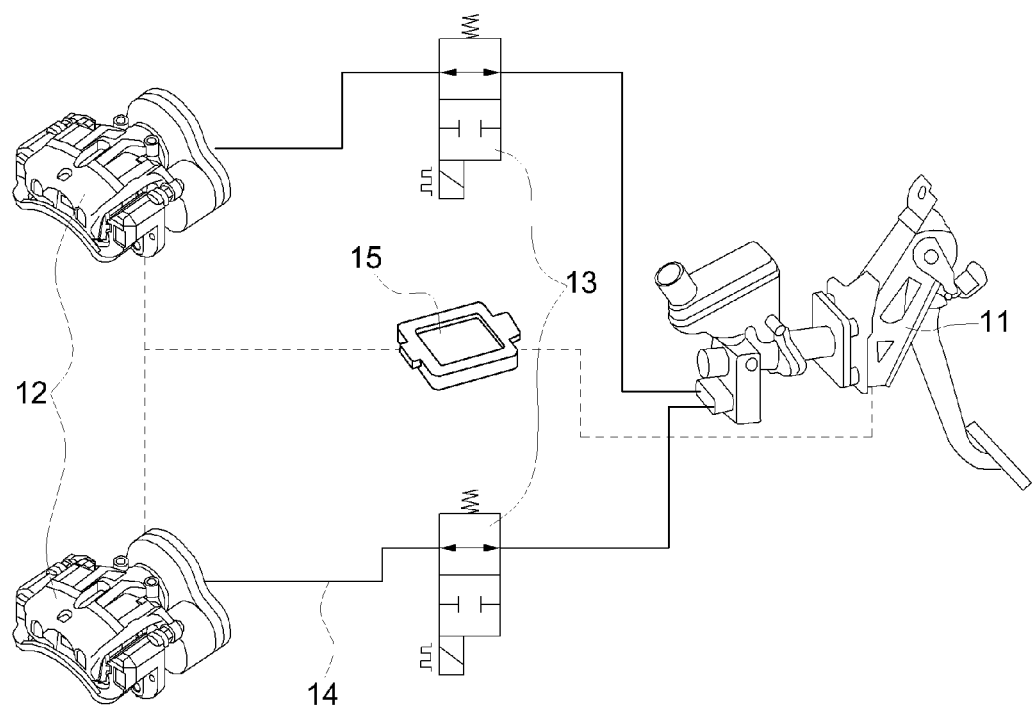
FIG. 1 is a view schematically illustrating an EMB system used in combination with a hydraulic device.
Figure 2:
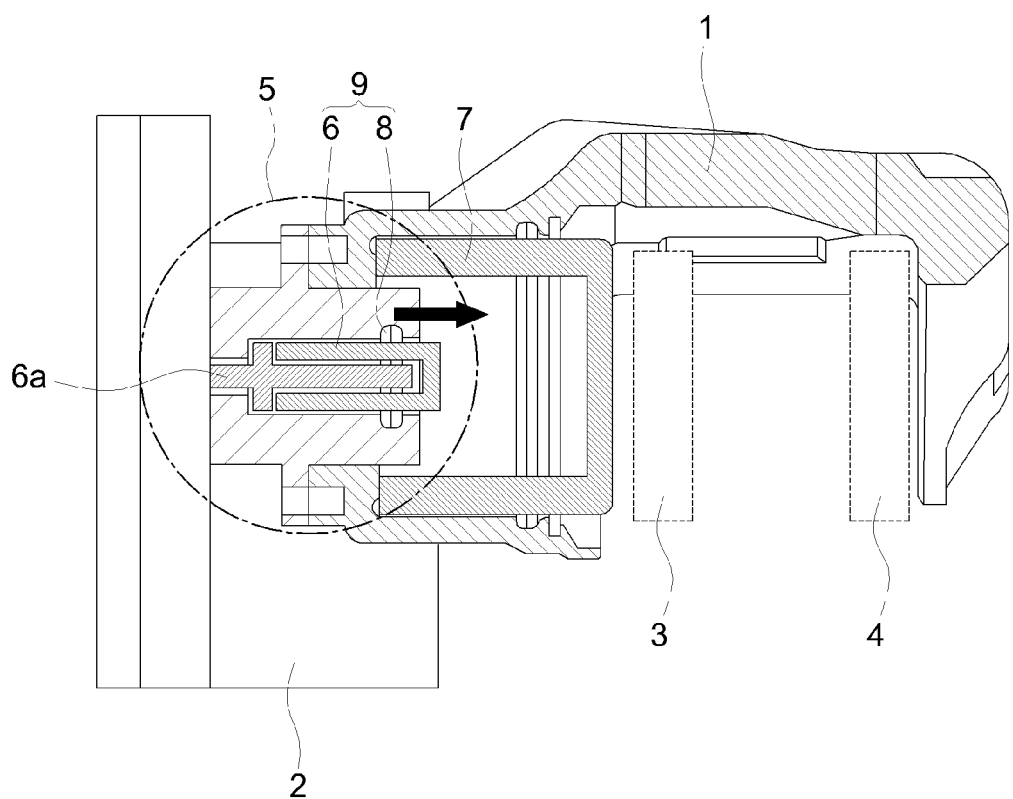
FIG. 2 is a view schematically illustrating a structure for pressing a piston in the EMB system of FIG. 1.

FIG. 1 is a view schematically illustrating an EMB system used in combination with a hydraulic device, and FIG. 2 is a view schematically illustrating a structure for pressing a piston in the EMB system of FIG. 1. Hereinafter, an EMB system used in combination with a hydraulic device will be briefly described with reference to FIGS. 1 and 2. The EMB system used in combination with a hydraulic device is specifically disclosed in Korean Patent No. 10-1138510 (published on Jun. 16, 2011).

Referring to FIG. 1, an EMB system 10 used in combination with a hydraulic device includes a pedal unit 11 which has a configuration in which a pedal simulator and a master cylinder are coupled, EMBs 12 which are connected with the master cylinder of the pedal unit 11 through hydraulic lines 14, and solenoid valves 13 which are installed in the hydraulic lines 14.

The pedal unit 11 provides brake operational feeling of a brake pedal to a driver through the pedal simulator, has a pedal sensor (not illustrated) to supply an electrical signal to an electronic control unit (ECU) 15 in accordance with a state in which the brake pedal is manipulated. The ECU 15 is configured to control braking force by receiving a signal from the pedal sensor and sending information to each wheel ECU, and control the solenoid valves 13.

The solenoid valve 13 is provided in the hydraulic line 14 to change a communication state of the hydraulic line 14, and controlled by the ECU 15. The solenoid valve 13 is formed in a normally open type that has a state in which the hydraulic line 14 is communicated when a control current is not provided.

Since the solenoid valve 13 maintains the hydraulic line 14 in the communication state even in a situation in which a control current for controlling the solenoid valve is not properly supplied due to a malfunction of an electric device, the driver may manipulate the brake pedal and perform an emergency brake through the EMB 12 using hydraulic pressure generated by the master cylinder.

As such, the EMB system 10 used in combination with a hydraulic device has a hydraulic abrasion correction structure, and is advantageous in reducing noise in a general EMB device, improving actuator efficiency, minimizing a size, and enabling mechanical emergency braking.

Referring to FIG. 2, a structure for pressing a piston in the EMB system used in combination with a hydraulic device includes: a caliper body 1 which performs braking using clamping force that presses a wheel disc; an EMB actuator 5 which is mounted on the caliper body 1, and generates braking force for brake discs 3 and 4 by boosting rotational force of a drive motor 2 using a gear (not illustrated); and a hydraulic piston device 9 which includes a master piston 6 which is fixed to the caliper body 1, and installed so as to be rectilinearly slidable with respect to the EMB actuator 5 by the EMB actuator 5, a slave piston 7 which rectilinearly slides by an action of hydraulic pressure that presses the master piston 6, and a seal 8 which is provided between the master piston 6 and the EMB actuator.

When the hydraulic piston device 9 is moved forward by the EMB actuator 5 or an action of hydraulic pressure, the hydraulic piston device 9 presses the brake disc 3, which is positioned at the inside from the wheel disc, against the wheel disc such that the caliper body 1 is moved due to reaction force generated by piston force, and the movement of the caliper body 1 presses the brake disc 4, which is positioned outside from the wheel disc, against the wheel disc such that clamping force is generated by both the brake discs 3 and 4.

In this case, piston pressing force, which is generated by the EMB actuator 5, is not directly transmitted to the slave piston 7, which constitutes the hydraulic piston device 9, but presses the master piston 6, and the slave piston 7 is moved forward by an action of hydraulic pressure that presses the master piston 6. In this case, boost force is generated due to a difference in cross-sectional area between the master piston 6 and the slave piston 7, and by this boost force, boost force generated by the gear may be minimized or eliminated, thereby avoiding a noise structure that occurs when using the gear, and the cause of efficiency deterioration. In addition, a size of the actuator may be reduced by minimizing a gear train, which is advantageous in reducing an overall size.

It is not necessary to consider abrasion for a stroke of the master piston 6, and it is enough if a stroke required to perform braking is ensured. Meanwhile, abrasion correction of the brake discs 3 and 4 is performed by the structure of the seal 8, which performs sealing while holding the slave piston 7, and by an opening operation of the solenoid valve 13 (see FIG. 1) after braking, in a manner similar to that in a general hydraulic brake device, and thus it is not necessary to design a length of an operational stroke of the master piston 6 while considering abrasion correction.

Meanwhile, the seal 8 may be mounted in a seal groove (not illustrated) that is relatively formed in any one of the master piston 6 and the EMB actuator 5.

In the case of the master piston 6, a spindle nut may be used, the spindle nut is disposed to be connected with a spindle screw 6a. The spindle screw 6a serves to convert rotational motion of the gear which is transmitted from the drive motor 2 into rectilinear motion.

Figure 3:
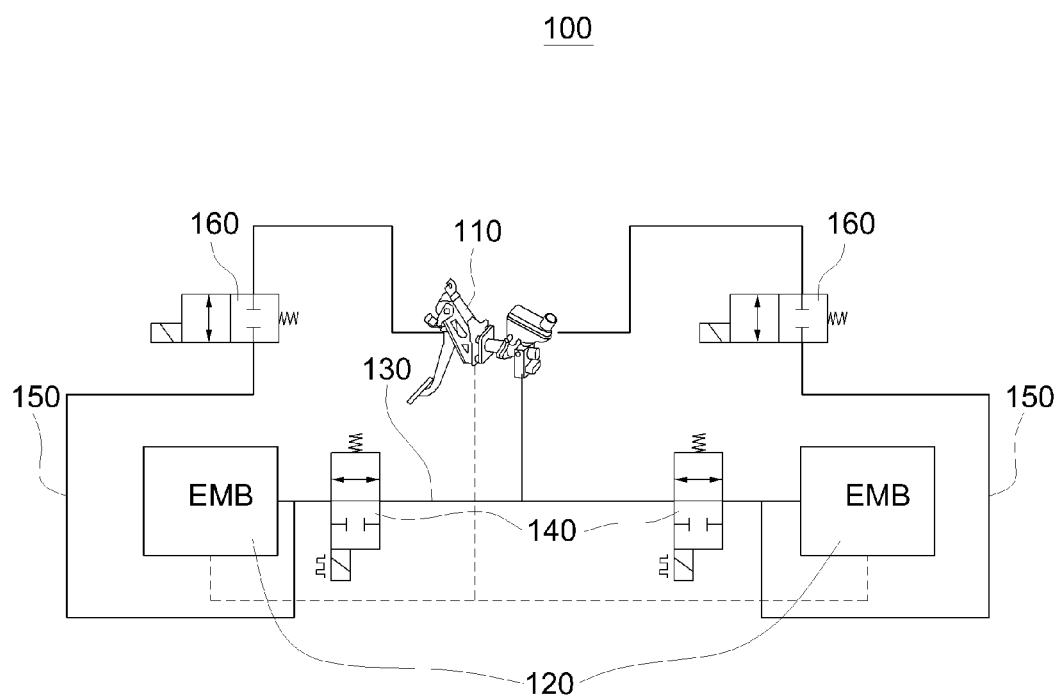
FIG. 3 is a view schematically illustrating a parking brake system of an EMB according to an exemplary embodiment of the present invention.

FIG. 3 is a view schematically illustrating a parking brake system 100 of an EMB according to an exemplary embodiment of the present invention. The parking brake system 100 of the EMB according to the exemplary embodiment of the present invention is provided with additional constituent elements to the EMB system 10 used in combination with a hydraulic device as illustrated in FIG. 1, and specifically, further includes two sets of hydraulic lines and solenoid valves.

The parking brake system 100 of the EMB includes a pedal unit 110 which has a configuration in which a pedal simulator and a master cylinder are coupled, EMBs 120 which have hydraulic piston devices, first hydraulic lines 130 which are connected so as to supply hydraulic pressure from the master cylinder to the hydraulic piston devices of the EMBs 120, first solenoid valves 140 which are provided to change a communication state of the first hydraulic lines 130, second hydraulic lines 150 which are extended between the first solenoid valves 140 and the EMBs 120, respectively, and connected to a reservoir (not illustrated), second solenoid valves 160 which are provided in the second hydraulic lines 150 so as to change a communication state of the second hydraulic lines 150. Here, it is noted that the EMB 120 is described with a concept including the caliper body 1, the EMB actuator 5, and the hydraulic piston device 9 that have been described with reference to FIG. 2. Because the caliper body, the EMB actuator, and the hydraulic piston device have been described above, a duplicated description will be omitted.

The pedal unit 110 provides brake operational feeling of a brake pedal to a driver through the pedal simulator, has a pedal sensor (not illustrated) to supply an electrical signal to an ECU (not illustrated) in accordance with a state in which the brake pedal is manipulated. The ECU is configured to control braking force by receiving a signal from the pedal sensor and sending information to each wheel ECU, and control the first and second solenoid valves 140 and 160.

The solenoid valves 140 and 160 are provided in the first hydraulic line 130 and the second hydraulic line 150, respectively, so as to change a communication state of each of the hydraulic lines 130 and 150. The solenoid valves 140 and 160 are controlled by the ECU. In this case, the first solenoid valve 140, which is provided in the first hydraulic line 130, is formed in a normally open type that has a state in which the first hydraulic line 130 is communicated when a control current is not provided.

Here, the first hydraulic lines 130 are formed to be divided (branched) to supply hydraulic pressure from the master cylinder to the hydraulic piston devices that are provided in the EMBs 120, respectively, and the first solenoid valves 140 are provided in the divided first hydraulic lines 130, respectively. In addition, the second hydraulic lines 150 are formed to be extended between the first solenoid valves 140 and the EMBs 120, respectively, and the second solenoid valves 160 are provided in the second hydraulic lines 150, respectively. That is, as illustrated in FIG. 3, two sets of first solenoid valves 140 and two sets of second solenoid valves 160 are provided.

The first solenoid valve 140 and the second solenoid valve 160 are formed in a normally closed type that the first solenoid valve 140 maintains a state in which the first solenoid valve 140 shuts off the first hydraulic line 130 when a parking brake signal is turned on, and the second solenoid valve has a state 160 in which the second solenoid valve 160 allows the second hydraulic line 150 to be communicated.

In the parking brake system 100 of the EMB which is configured as described above, at the time of a malfunction, or at the time of correcting abrasion of the brake disc, the first solenoid valve 140 allows the first hydraulic line 130 to be communicated, thereby obtaining braking force or correcting abrasion of the brake disc through the EMB 120 using hydraulic pressure from the master cylinder in accordance with a manipulation of the brake pedal, and at the time of normal braking, the first solenoid valve 140 shuts off the first hydraulic line 130, such that the EMB 120 autonomously forms braking force for each wheel under control of the ECU and the wheel ECU in accordance with a manipulation state of the brake pedal in a state in which hydraulic pressure from the master cylinder is excluded.

At the time of initiating a parking brake (that is, when a parking brake signal is turned on), in like manner, the first solenoid valve 140 maintains a state in which the first hydraulic line 130 is shut off, and the second solenoid valve 160 allows the second hydraulic line 150 to be communicated so as to control hydraulic pressure to be reduced, such that the EMB 120 autonomously forms braking force in a state in which hydraulic pressure is excluded.

Figure 4:
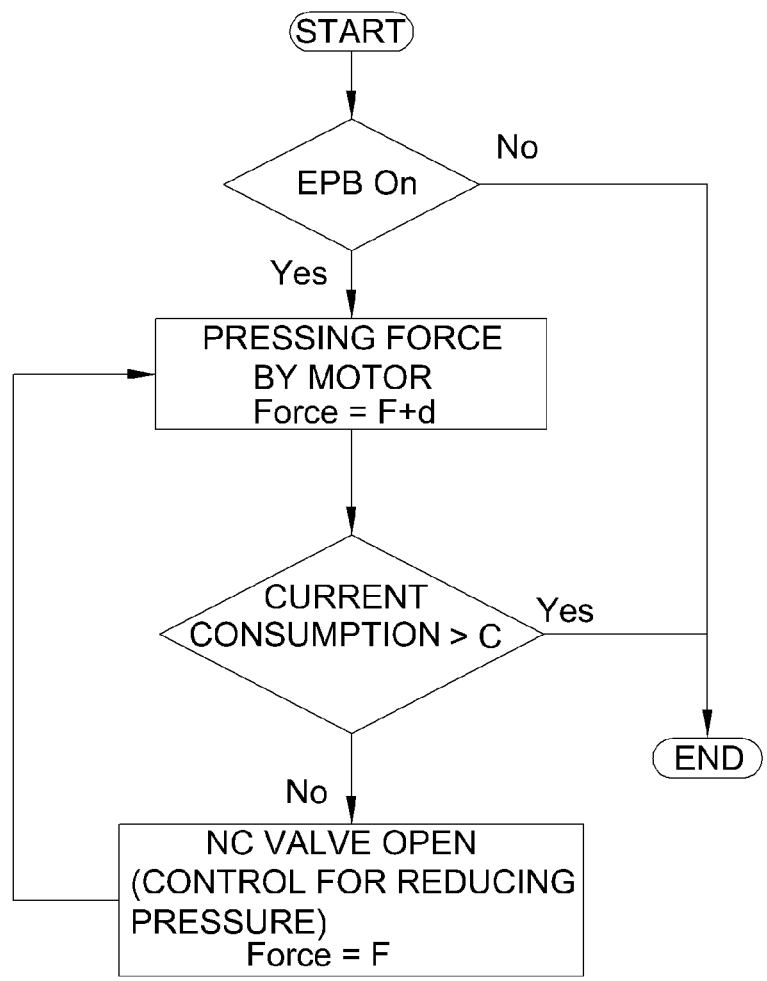
FIG. 4 is a flowchart of a parking brake control method for the EMB according to the exemplary embodiment of the present invention.

In this regard, FIG. 4 is a flowchart of a parking brake control method for the EMB according to the exemplary embodiment of the present invention. The present invention is based upon the premise that the parking brake control method for the EMB according to the exemplary embodiment of the present invention is a control method for the parking brake system of the EMB which is illustrated in FIG. 3.

Referring to FIG. 4, the parking brake control method for the EMB includes: a first step of generating braking force through the drive motor, which has an amount of force F+d that is produced by adding a predetermined amount of force d to an amount of clamping force F that is required when the parking brake signal is turned on; a second step of controlling the amount of force F+d to be reduced to the amount of force F when the second solenoid valve 160 allows the second hydraulic line 150 to be communicated; a third step of allowing the braking force to have the amount of force F+d by pressing the master piston 6 (see FIG. 2) using the drive motor; a fourth step of repeatedly performing the second and third steps until the master piston 6 comes into contact with the slave piston 7 (see FIG. 2); and a fifth step of constraining rotational force of the drive motor 2 of the EMB actuator 5 when the master piston 6 comes into contact with the slave piston 7.

In the fourth step, the contact between the master piston 6 and the slave piston 7 is determined while assuming that this contact occurs when current consumption exceeds a reference value. When the master piston 6 comes into contact with the slave piston 7, an effect of boost force generated by hydraulic pressure disappears, and it is impossible to press the master piston 6 with the amount of force F+d or a current consumption is increased to exceed a normal usage range. Therefore, by sensing whether the current consumption exceeds a reference value, the contact between the master piston 6 and the slave piston 7 may be determined.

As described above, in the exemplary embodiments of the present invention, the hydraulic lines, which are extended between the existing solenoid valves and the EMB actuators and connected to the reservoir, are added to the EMB system used in combination with a hydraulic device, and the solenoid valves, which may change communication states of the hydraulic lines, are added, and as a result, a structure in which braking clamping force is supported by a mechanical device, which excludes hydraulic pressure when performing a parking brake function, may be implemented even in the EMB system used in combination with a hydraulic device.

In the above description, the exemplary embodiments of the present invention have been described, but those with ordinary skill in the art to which the present invention pertains may variously modify and alter the present invention without departing form the spirit of the present invention disclosed in the claims by adding, changing, and deleting constituent elements, and the modification and alteration also belong to the scope of the present invention.

What is claimed is:

1. A parking brake apparatus, comprising:
    a pedal coupled to a pedal simulator and a master cylinder, the pedal comprising a sensor configured to supply an electrical signal to an electronic control unit (ECU) based on a depression of the pedal;
    a first electromechanical brake (EMB) comprising a first hydraulic piston;
    a second EMB comprising a second hydraulic piston;
    a first hydraulic line configured to supply hydraulic pressure from the master cylinder to the first hydraulic piston;
    a second hydraulic line configured to supply hydraulic pressure from the master cylinder to the second hydraulic piston;
    a first solenoid valve configured to change a communication state of the first hydraulic line;
    a second solenoid valve configured to change a communication state of the second hydraulic line;
    a third hydraulic line extending from the first line to a reservoir;
    a fourth hydraulic line extending from the second line to the reservoir;
    a third solenoid valve configured to change a communication state of the third hydraulic line;
    a fourth solenoid valve configured to change a communication state of the fourth hydraulic line;
    a drive motor configured to drive at least one of the first hydraulic piston or the second hydraulic piston,
    wherein the electronic control unit (ECU) is configured to:
        generate a first amount of braking force by controlling the drive motor;

generate a second amount of braking force by controlling the third solenoid valve and the fourth solenoid valve to allow communication of the third and fourth hydraulic lines, the second amount of braking force being less than the first amount of braking force;

repeat the generating of the first amount of braking force and the generating of the second amount of braking force; and stop the repeating of the generating of the first amount of braking force and the generating of the second amount of braking force, in response to a current consumption of the drive motor exceeding a threshold.

2. The parking brake apparatus of claim 1, wherein the ECU is further configured to receive a signal from the sensor, and to control the first, second, third, and fourth solenoid valves based on the signal.

3. The parking brake apparatus of claim 1, wherein the first and second solenoid valves are configured to be open, in response to a control current not being provided to the first and second solenoid valves.

4. The parking brake apparatus of claim 3, wherein the first and second solenoid valves are configured to be closed, in response to a parking brake signal being turned on, and the third and fourth solenoid valves are configured to be open, in response to the parking brake signal being turned on.

5. The parking brake apparatus of claim 4, wherein the EMB comprises:
a caliper body;
an EMB actuator mounted on the caliper body and configured to generate braking force for a brake disc by boosting rotational force of the drive motor using a gear; and
a hydraulic piston comprising:
a master piston fixed to the caliper body and rectilinearly slidable with respect to the EMB actuator by the EMB actuator;
a slave piston comprising a hydraulic pressure chamber and rectilinearly slidable by an action of hydraulic pressure that presses the master piston; and
a seal disposed between the master piston and the EMB actuator.

6. The parking brake apparatus of claim 5, wherein the caliper body is configured to brake by using a clamping force pressing on a wheel disc.

7. The parking brake apparatus of claim 6, wherein:
the hydraulic piston is configured to press the brake disc, in response to the hydraulic piston moving forward by the EMB actuator, or by an action of hydraulic pressure,
the hydraulic piston is positioned at the inside from the wheel disc and against the wheel disc such that the caliper body is configured to move due to a reaction force generated by a piston force,
the caliper body is configured to press against the brake disc, and
the brake disk is positioned outside of the wheel disc and against the wheel disc such that clamping force is generated by the brake disc.

8. The parking brake apparatus of claim 7, wherein the slave piston is configured to be moved forward by action of hydraulic pressure that presses the master piston.

9. The parking brake apparatus of claim 5, wherein the seal is mounted in a seal groove formed in any one of the master piston or the EMB actuator.

10. The parking brake apparatus of claim 5, wherein the master piston is a spindle nut.

11. The parking brake apparatus of claim 5, wherein the first and second hydraulic lines are configured to supply hydraulic pressure from the master cylinder to the hydraulic piston.

12. The parking brake apparatus of claim 11, wherein the third hydraulic line extends from a portion of the first line between the first solenoid valve and the first EMB, and the fourth hydraulic line extends from a portion of the second line between the second solenoid valve and the second EMB.

13. The parking brake system of claim 5, wherein the ECU is further configured to:
control the drive motor to constrain rotational force of the drive motor, in response to the stopping of the repeating of the generating of the first amount of braking force and generating of the second amount of braking force,
wherein master piston is in contact with the slave piston during the constraining of the rotational force of the drive motor.

14. The park brake system of claim 13, wherein the contact between the master piston and the slave piston is determined by the ECU using an assumption that the contact occurs in response to the current consumption exceeding the reference value.

15. The parking brake system of claim 13, wherein the first braking force is equal to an amount of initial force plus an amount of clamping force that is required when a parking brake signal is turned on.

16. The parking brake system of claim 14, wherein the second braking force is equal to the amount of clamping force that is required when the parking brake signal is turned on.

17. A parking brake apparatus, comprising:
a pedal coupled to a pedal simulator and a master cylinder, the pedal comprising a sensor configured to supply an electrical signal to an electronic control unit (ECU) based on a depression of the pedal;
a first electromechanical brake (EMB) comprising a first hydraulic piston;
a second EMB comprising a second hydraulic piston;
a first hydraulic line configured to supply hydraulic pressure from the master cylinder to the first hydraulic piston;
a second hydraulic line configured to supply hydraulic pressure from the master cylinder to the second hydraulic piston;
a first solenoid valve configured to change a communication state of the first hydraulic line;
a second solenoid valve configured to change a communication state of the second hydraulic line;
a third hydraulic line extending from the first line to a reservoir;
a fourth hydraulic line extending from the second line to the reservoir;
a third solenoid valve configured to change a communication state of the third hydraulic line;
a fourth solenoid valve configured to change a communication state of the fourth hydraulic line;
a drive motor configured to drive either one or both of the first hydraulic piston and the second hydraulic piston,
wherein the electronic control unit (ECU) is configured to:
generate a first amount of braking force by controlling the drive motor;

generate a second amount of braking force by controlling the third solenoid valve and the fourth solenoid valve to allow communication of the third and fourth hydraulic lines, the second amount of braking force being less than the first amount of braking force;
repeat the generating of the first amount of braking force and the generating of the second amount of braking force;
determine that the master piston contacts the slave piston, in response to sensing that a current consumption exceeds a reference value; and
constrain rotation of the drive motor, in response to the determination that the master piston contacts the slave piston.

\* \* \* \* \*